(12) United States Patent
Cook

(10) Patent No.: US 9,013,996 B2
(45) Date of Patent: Apr. 21, 2015

(54) CUSTOMER CONFIGURATION OF BROADBAND SERVICES

(75) Inventor: Charles I. Cook, Louisville, CO (US)

(73) Assignee: CenturyLink Intellectual Property LLC, Denver, CO (US)

(*) Notice: Subject to any disclaimer, the term of this patent is extended or adjusted under 35 U.S.C. 154(b) by 441 days.

(21) Appl. No.: 13/473,326

(22) Filed: May 16, 2012

(65) Prior Publication Data

US 2013/0308453 A1    Nov. 21, 2013

(51) Int. Cl.
| | | |
|---|---|---|
| *H04L 12/26* | (2006.01) | |
| *H04L 12/28* | (2006.01) | |
| *H04L 12/24* | (2006.01) | |
| *H04L 12/14* | (2006.01) | |

(52) U.S. Cl.
CPC ......... *H04L 12/2878* (2013.01); *H04L 12/1432* (2013.01); *H04L 12/1489* (2013.01); *H04L 41/32* (2013.01); *H04L 41/5029* (2013.01)

(58) Field of Classification Search
CPC ............ H04L 12/2801; H04L 12/2878; H04L 2012/5675; H04L 12/26; H04L 12/24; H04Q 11/0478; H04N 21/6175; H04N 21/6156; H04W 88/00; H04W 88/08; H04W 72/044; H04W 72/0044
USPC .................. 370/395, 201, 493, 390, 442, 235
See application file for complete search history.

(56) References Cited

U.S. PATENT DOCUMENTS

| | | | |
|---|---|---|---|
| 6,385,302 B1 | 5/2002 | Antonucci et al. | |
| 6,826,168 B2 * | 11/2004 | Galyas et al. | 370/340 |
| 7,233,781 B2 | 6/2007 | Hunter et al. | |
| 7,477,603 B1 * | 1/2009 | Pandian | 370/235 |
| 7,756,913 B1 | 7/2010 | Day | |
| 7,860,964 B2 | 12/2010 | Stolorz et al. | |
| 7,903,553 B2 | 3/2011 | Liu | |
| 8,412,147 B2 | 4/2013 | Hunter et al. | |
| 8,489,731 B2 | 7/2013 | Gagliardi et al. | |
| 8,804,720 B1 * | 8/2014 | Rainovic et al. | 370/390 |
| 8,873,717 B2 | 10/2014 | Bugenhagen | |
| 2002/0136231 A1 * | 9/2002 | Leatherbury et al. | 370/442 |
| 2003/0020764 A1 | 1/2003 | Germain et al. | |
| 2003/0231635 A1 * | 12/2003 | Kalkunte et al. | 370/395.42 |
| 2004/0196842 A1 | 10/2004 | Dobbins | |
| 2005/0160154 A1 | 7/2005 | Raciborski et al. | |
| 2006/0143293 A1 | 6/2006 | Freedman et al. | |
| 2006/0285500 A1 | 12/2006 | Booth et al. | |
| 2007/0064604 A1 | 3/2007 | Chen et al. | |

(Continued)

OTHER PUBLICATIONS

U.S. Appl. No. 13/302,051, Non-Final Office Action dated Apr. 9, 2014; 6 pages.

(Continued)

*Primary Examiner* — Kwang B Yao
*Assistant Examiner* — Syed M Bokhari
(74) *Attorney, Agent, or Firm* — Swanson & Bratschun, L.L.C.

(57) ABSTRACT

Novel solutions to provide enhanced configurability of network access. Such solutions can provide, inter alia, enhanced utilization of network resources (including without limitation network aggregation devices, such as DSLAMs and the like). In an aspect of some solutions, a network aggregation device can divide an aggregate uplink bandwidth into a plurality of time slots. Some or all of the time slots can be reserved for different customers (subscribers). In another aspect of some embodiments, the time slots can be allocated in such a way as to simulate oversubscription of the aggregate uplink bandwidth.

30 Claims, 7 Drawing Sheets

(56) References Cited

U.S. PATENT DOCUMENTS

| | | |
|---|---|---|
| 2007/0104227 A1* | 5/2007 | Rivera .................... 370/493 |
| 2008/0089237 A1 | 4/2008 | Molen et al. |
| 2008/0295131 A1 | 11/2008 | Grover et al. |
| 2010/0100629 A1 | 4/2010 | Raciborski et al. |
| 2010/0246436 A1 | 9/2010 | Yang et al. |
| 2010/0257264 A1 | 10/2010 | Assadzadeh |
| 2012/0126976 A1 | 5/2012 | Bugenhagen |
| 2012/0131096 A1 | 5/2012 | Bugenhagen |
| 2012/0131466 A1 | 5/2012 | Bugenhagen |
| 2012/0224572 A1 | 9/2012 | Mody et al. |
| 2012/0250491 A1* | 10/2012 | Goodson et al. ............. 370/201 |
| 2013/0241726 A1 | 9/2013 | Hunter et al. |
| 2013/0294377 A1* | 11/2013 | Quigley et al. ............. 370/329 |

OTHER PUBLICATIONS

U.S. Appl. No. 13/302,053, Notice of Allowance dated Jun. 26, 2014; 21 pages.

U.S. Appl. No. 13/302,055; Non-Final Rejection dated Jan. 6, 2014; 42 pages.

U.S. Appl. No. 13/302,051, Non-Final Office Action dated Aug. 1, 2014; 24 pages.

U.S. Appl. No. 13/302,053, Issue Notification dated Oct. 8, 2014; 1 page.

U.S. Patent Application No. 13/302,055; Final Rejection dated Aug. 26, 2014; 30 pages.

U.S. Appl. No. 13/302,051, filed Nov. 22, 2011 by Michael K. Bugenhagen, and entitled, "User-Based Monitoring and Control." 41 pages.

U.S. Appl. No. 13/302,053, filed Nov. 22, 2011 by Michael K. Bugenhagen, and entitled, "Emergency Alert Signaling;" 45 pages.

U.S. Appl. No. 13/302,055, filed Nov. 22, 2011 by Michael K. Bugenhagen, and entitled, "User Control Over Content Delivery." 40 pages.

U.S. Appl. No. 13/302,051, Final Rejection dated Jan. 2, 2015; 20 pages.

U.S. Appl. No. 13/302,055; Notice of Allowance dated Dec. 19, 2014; 21 pages.

* cited by examiner

| Label | Subscriber |
|---|---|
| 465a | Subscriber A |
| 470a | Subscriber B |
| 470b | Subscriber B |
| 470c | Subscriber B |
| 470d | Subscriber B |
| 465b | Subscriber A |
| 470e | Subscriber B |
| 470f | Subscriber B |
| 470g | Subscriber B |
| 470h | Subscriber B |
| 465c | Subscriber A |
| 475a | Subscriber C |
| 475b | Subscriber D |
| 475c | Subscriber E |
| 475d | Subscriber F |
| 465d | Subscriber A |
| 475e | Subscriber G |
| 475f | Subscriber H |
| 475g | Subscriber I |
| 475h | Subscriber J |

CUSTOMER CONFIGURATION OF BROADBAND SERVICES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to broadband network services, and more particularly, to tools and techniques that can enhance the utilization of broadband services through an access network.

BACKGROUND

An Internet service provider ("ISP") typically will employ an access network to allow subscribers access to the ISP's core network, and from there, to the Internet. A typical access network will employ a plurality of aggregation devices, each of which serves multiple subscribers and functions to aggregate the individual subscriber connections (e.g., local loops) into a single, higher-bandwidth connection to the access network. For example, in a digital subscriber line ("DSL") network, a DSL access multiplexor ("DSLAM") multiplexes connections for multiple subscribers into a single, high-capacity uplink to the provider's core network.

In most implementations, an ISP will offer different classes of service, with varying performance parameters (bandwidth, latency, etc.), which can be selected by a subscriber depending on the subscriber's applications and budget. Generally, such services can be categorized as "business class" and "residential class." Within those general categories, several different tiers might be offered, each having different performance parameters. In general, business class service provides the subscriber with higher performance guarantees and more management capabilities and, correspondingly, is accompanied by higher fees.

In most networks, a single aggregation device (e.g., a DSLAM) is not used to serve both business and residential subscribers. Instead, an ISP will offer multiple DSLAMs in a given area, with one (or more) being dedicated to residential class service and one (or more) being dedicated to business class. The reason for this duality is that it is difficult to employ a single DSLAM for these disparate types of access. Instead, a business class DSLAM will be configured with advanced Quality of Service ("QoS") and management capabilities, with plenty of excess capacity to ensure guaranteed bandwidth to business class customers, while a residential class DSLAM will be tasked with providing access to the greatest possible number of subscribers at the lowest possible rates.

This situation results in suboptimal utilization of the ISP's network resources (including, in particular, the aggregation devices themselves). The business class DSLAM generally will be undersubscribed, in order to meet performance guarantees, while the residential DSLAM (which might also be undersubscribed) has little ability to offer any type of guaranteed performance tiers to the subscribers (so as to encourage subscribers to upgrade to different tiers) or to differentiate between different subscribed performance characteristics. It some cases, is possible to offer differing performance tiers based on setting QoS priorities, but even then, the ISP has no control relative to guaranteeing throughput on a per subscriber basis or controlling the level at which the DSLAM backhaul link (uplink) is oversubscribed at any given point in time.

Thus, there is a need for access solutions that provide more robust and flexible utilization of network resources.

BRIEF SUMMARY

A set of embodiments provides novel solutions to provide enhanced configurability of network access. Such embodiments can provide, inter alia, enhanced utilization of network resources (including without limitation network aggregation devices, such as DSLAMs and the like). In an aspect of some embodiments, a network aggregation device can divide an aggregate uplink bandwidth into a plurality of time slots. Some or all of the time slots can be reserved for different customers (subscribers). In another aspect of some embodiments, the time slots can be allocated in such a way as to simulate oversubscription of the aggregate uplink bandwidth. Merely by way of example, in some cases, if traffic for a particular subscriber is queued for transmission, that traffic might not be transmitted until a time slot allocated to that subscriber has occurred. This restriction can be implemented even if there is no traffic transmitted during the intervening time slots.

This time-slicing technique can provide multiple benefits. For one thing, it simulates oversubscription, so that a subscriber does not over-consume network resources above that subscriber's allocated subscription. Additionally, this technique can ensure that a subscriber will have the ability to transmit during that subscriber's allocated time slots, even if a different subscriber has a significant amount of queued traffic awaiting transmission when the first subscriber's time slot arrives. The allocation of time slots can be arranged to implement a variety of different QoS characteristics as well.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with one set of embodiments provides configurable network services to both residential and business customers. In one aspect, the method can comprise providing, with a DSLAM, network connections for a plurality of subscribers. In another aspect, the plurality of subscribers might comprise a residential subscriber charged a residential subscription rate and a business subscriber charged a business subscription rate. In some embodiments, the DSLAM having an aggregate uplink bandwidth to an ISP.

The method might further comprise dividing, with a management computer, the aggregate upstream bandwidth into a plurality of time slots and/or maintaining, with the management computer, a list of time slot assignments. The list of time slot assignments, in some cases, correlates reserved time slots with subscribers and/or identifies unreserved time slots. In some cases, the method further comprises reserving, with the management computer, a first subset of the time slots for the residential subscriber; the first subset of time slots might have a first aggregate amount of time. Similarly, the method might include reserving, with the management computer, a second subset of the time slots for the business subscriber, and the second subset of time slots might have a second aggregate amount of time.

In another embodiment, the method comprises simulating oversubscription of the aggregate upstream bandwidth by transmitting network traffic for the residential subscriber only during the first subset of the plurality of time slots, transmitting network for the business subscriber only during the second subset of the plurality of time slots, and/or not transmitting any network traffic for any subscriber during the unreserved time slots.

In some cases, the method comprises providing, e.g., with the management computer, a user interface to receive user input from subscribers and/or receiving first user input from the residential subscriber identifying a first one or more network traffic types. The method can include allocating the first subset of time slots based at least in part on the identified first one or more network traffic types. Similarly, the method can include receiving second user input from the business subscriber identifying a second one or more network traffic types, and/or allocating the second subset of time slots based at least in part on the identified second one or more network traffic types.

A method in accordance with another set of embodiments might comprise providing, with a network aggregation device, network connections for a plurality of subscribers; in an aspect, the network aggregation device might have an aggregate uplink bandwidth. The method, then, can include dividing the aggregate uplink bandwidth into a plurality of time slots and/or reserving one or more of the plurality of time slots for each of the plurality of customers. The method might also feature simulating oversubscription of the aggregate uplink bandwidth through allocation of the plurality of time slots.

A system in accordance with yet another set of embodiments might comprise a network aggregation device that provides network connections for a plurality of subscribers, with the network aggregation device having an aggregate uplink bandwidth. The system might also comprise a management computer in communication with the network aggregation device. In some embodiments, the network aggregation device might comprise the management computer, while in other embodiments, the devices might be separate.

In an aspect, the management computer might comprise one or more processors and a computer readable medium in communication with the one or more processors. In another aspect, the computer readable medium might have encoded thereon a set of instructions executable by the computer system to perform one or more operations.

The set of instructions might include instructions to perform operations in accordance with the methods of other embodiments. Merely by way of example, the set of instructions might include instructions for dividing the aggregate upstream bandwidth into a plurality of time slots, instructions for reserving one or more of the plurality of time slots for each of the plurality of customers, and/or instructions for simulating oversubscription of the aggregate upstream bandwidth through allocation of the plurality of time slots.

An apparatus in accordance with yet a further set of embodiments might comprise a computer readable medium having encoded thereon a set of instructions executable by one or more computers to perform one or more operations (including without limitation operations in accordance with the methods of various embodiments). Such instructions can include, merely by way of example, instructions for configuring a network aggregation device that provides network connections for a plurality of subscribers, the network aggregation device having an aggregate uplink bandwidth; instructions for dividing the aggregate upstream bandwidth into a plurality of time slots; instructions for reserving one or more of the plurality of time slots for each of the plurality of customers; and/or instructions for simulating oversubscription of the aggregate upstream bandwidth through allocation of the plurality of time slots.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A and 4B illustrate time slicing techniques, in accordance with various embodiments.

DETAILED DESCRIPTION OF CERTAIN EMBODIMENTS

Figure 1:
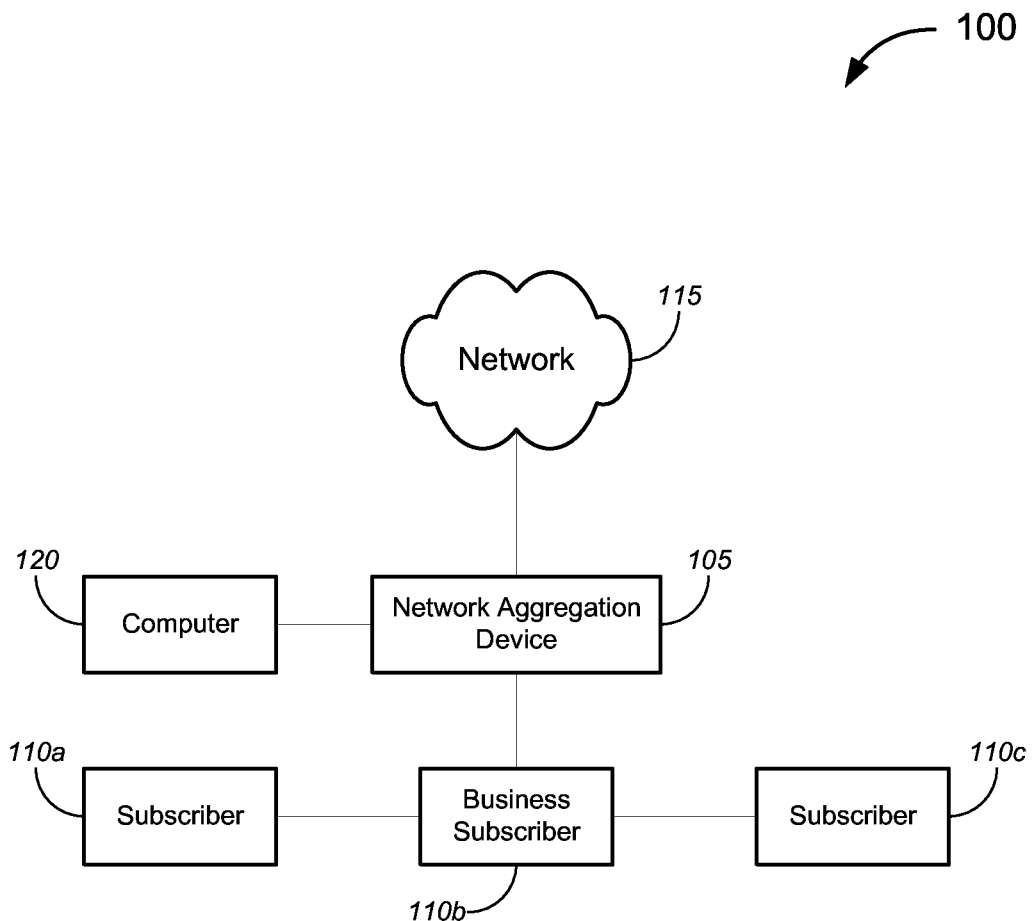
FIGS. 1-3 are block diagrams illustrating systems for providing configurable network services, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments provides novel solutions to provide enhanced configurability of network access. In an aspect, some embodiments can provide several benefits, including without limitation, enhanced utilization of network resources (including without limitation network aggregation devices, such as DSLAMs and the like), enhanced configurability and flexibility of service offerings, and/or greater potential for subscriber self-management of service levels. As explained in further detail below, these and other benefits can maximize subscriber satisfaction and also increase network efficiencies for the provider.

Merely by way of example, in some embodiments, the tools and techniques disclosed herein can allow a provider to employ a single network aggregation device (such as a DSLAM, to name but one example) to provide several classes of service, including both residential service and business service, and/or both guaranteed service and best-effort service. Similarly, various embodiments can allow a provider to offer several different QoS configurations for different applications. Further, by simulating oversubscription at the aggregation device, certain embodiments allow the provider to offer clear distinctions between different classes of service.

As another example of benefits provided by certain embodiments, some embodiments can offer a subscriber access to a user interface to configure that subscriber's network service, including the amount of bandwidth consumed by the subscriber (and/or or the configuration of other parameters to optimize the service for that subscriber's needs. This flexibility can allow the subscriber to subscribe to a higher level of service on a transient basis, as needed, while allowing the subscriber to fall back to a more limited tier of service at other times. Likewise, some embodiments can allow a subscriber to configure, on his or her own, various network performance parameters without requiring the hassle (for the subscriber) and expense (for the provider) of a service call to a technician to configure the services from within the ISP network.

In an aspect some embodiments can provide these (and other) benefits by employing a network aggregation configured to divide an aggregate uplink bandwidth into a plurality of time slots using a time-slicing technique. Some or all of the time slots can be reserved for different customers (subscribers). The size (duration) and distribution of the time slots can be used to tune network parameters. This time-slicing technique can provide a variety of flexible configuration options for the provider (including without limitation, self-configuration of services by the subscriber, as mentioned above). For example, one subscriber might be allocated one or more time slots comprising a first aggregate amount of time, and another might be allocated one or more time slots comprising a second aggregate amount of time (which might be more than, less than, or the same as the first aggregate amount of time). Alternatively and/or additionally, these aggregate amounts of time may be dynamically adjusted in real time and/or in response to a given algorithm or other stimuli.

As another example, the time-slicing technique can simulate oversubscription of the network aggregation device, so that a subscriber does not over-consume network resources above that subscriber's allocated subscription. Merely by way of example, in some cases, if traffic for a particular subscriber is queued for transmission, that traffic might not be transmitted until a time slot allocated to that subscriber occurs, and if, at the end of the time slot, traffic remains for transmission, that remaining traffic will be queued for transmission during the next time slot allocated to that subscriber. This restriction can be implemented even if there is no traffic transmitted during the intervening time slots. Correspondingly, this technique can ensure that a subscriber will have the ability to transmit during that subscriber's allocated time slots, even if a different subscriber has a significant amount of queued traffic awaiting transmission when the first subscriber's time slot arrives. Such a mechanism also can provide the ability to allocate bandwidth to emergency services in times of need or as appropriate without excluding other customers from using the remaining bandwidth.

The allocation of time slots can be arranged to implement a variety of different QoS characteristics as well. Merely by way of example, a low-bandwidth, low-latency application might be allocated a number of narrow time slots distributed evenly throughout the overall time-slicing pattern, while an application that requires high bandwidth but is relatively latency-insensitive can be allocated fewer, larger time slots. In some cases, multiple, consecutive time slots can be joined to create a single, larger time slot for a particular subscriber. As explained in more detail below, the techniques provided by various embodiments allow greatly enhanced flexibility and traffic management potential.

Turning now to the figures, FIG. 1 illustrates a system for providing configurable network services, in accordance with one set of embodiments. The system 100 comprises a network aggregation device 105, which serves multiple subscribers 110 and provides a connection between those subscribers 110 and a network 115, which might be an ISP's access network and/or core network, but which also might be the Internet or any other appropriate network, via an uplink between the network aggregation device 105 and the network 115. In an exemplary embodiment, the network aggregation device 105 is a device (such as a DSLAM, Optical Network Unit ("ONU") in an ISP's access network, and the network 115 is the ISP's core network, which provides communication with the Internet (not illustrated in FIG. 1). Although this disclosure refers mainly to an xDSL access network (in which the network aggregation device 105 most typically is a DSLAM), it should be appreciated that a number of different access optical, electronic and/or wireless network topologies are known (of which a passive optical network ("PON") is but one example), and each such topology might employ different types of network aggregation devices 105 (such as an ONU in a PON access network), a wireless modem or router in a wireless access network (such as a wireless wide area network ("WWAN") to name one example), and/or the like. Various embodiments can be employed in a variety of such networks, as appropriate, and the term "network aggregation device" therefore should be understood to be any device that can perform the task of aggregating and/or multiplexing connections with multiple subscribers.

In a particular embodiment, each subscriber 110 can be considered a subscriber premises (e.g., a residential or business location served by the network aggregation device 105) and might itself comprise a premises network, with appropriate connection hardware (not shown in FIG. 1), such as a router, modem, etc. to provide communication between the premises network and the network aggregation device 105. Alternatively and/or additionally, each subscriber 110 might be considered a particular device, such as a DSL modem, router, wireless phone, personal computer, etc. that accesses the network 115 via the network aggregation device 105.

The functionality of the network aggregation device 105 in accordance with various embodiments is described in further detail below. In a general sense, however, the network aggregation device 105 functions to provide connectivity between a plurality of subscribers 110 and the network 115, and in an aspect of some embodiments, the network aggregation device 105 can be configured (e.g., by the subscribers 110 themselves, by a network administrator, etc.) to provide flexible connectivity options (some of which are described further below) to one or more of the subscribers 110. In another aspect, these services can be provided using a time-slicing technique to allocate to each subscriber 110 one or more time slots (e.g., from within a repeating group of time slots using a time-division multiplexing ("TDM") technique) corresponding to the relative bandwidth purchased by each subscriber 110 and/or according to the CoS needs of one or more of the subscribers 110.

In some embodiments, the system 100 includes a management computer 120 that configures the network aggregation device 105 to operate as described herein. In some embodiments, the management computer 120 can be a separate device that is in communication with the network aggregation device 105. The location of the management computer 120 is discretionary: in some cases, it might be co-located with the network aggregation device 105 (e.g., in a cabinet that is disposed in the access network between the network 115 and the subscribers 110), while in other cases, the management computer 120 can be located in the network 115, at a subscriber location, or elsewhere. In other embodiments, the network aggregation device 105 might comprise the management computer 120 and/or incorporate the functionality thereof.

In a particular aspect, the management computer 120 operates to configure the network aggregation device 105 to implement a time-slicing arrangement, as described herein. More particularly, the management computer 120 can be programmed to implement some or all of the operations described below with respect to the methods provided by various embodiments. Merely by way of example, in one embodiment, the management computer might receive user input from one or more subscribers (either through a user interface provided by the management computer 120 or through a user interface provided by another computer in communication with the management computer 120). Based on that user input, the management computer 120 can configure the network aggregation device 105 to implement the services requested by the subscribers' user input, for example, as described in more detail below.

In an aspect, then, the management computer 120 comprises (and/or provides) a user interface. The user interface allows users (e.g., subscribers, administrators, etc.) to interact with the management computer 120, and/or with the network aggregation device 105 itself (e.g., indirectly, through configuration provided by the management computer 120). A variety of user interfaces may be provided in accordance with various embodiments, including without limitation graphical user interfaces that display, for a user, display screens for providing information to the user and/or receiving user input from a user.

Merely by way of example, in some embodiments, the management computer 120 may be configured to communicate with a client computer via a dedicated application running on the client computer; in this situation, the user interface might be displayed by the client computer, based on data and/or instructions provided by the management computer. In this situation, providing the user interface might comprise providing instructions and/or data to cause the client computer to display the user interface. In other embodiments, the user interface may be provided from a web site, e.g., by providing a set of one or more web pages, which might be displayed in a web browser running on the user's computer and/or might be served by a web server (not shown on FIG. 1). In various embodiments, the management computer 120 might comprise the web server and/or be in communication with the web server, such that the management computer provides data to the web server to be incorporated in web pages served by the web server for reception and/or display by a browser at the user's computer.

More generally, it should be understood that the functionality of the management computer, which includes, inter alia, receiving user input, determining configuration parameters for the network aggregation device to implement services requested by subscribers and/or as specified by ISP policies, etc., and interfacing with the network aggregation device 105 itself, can be divided among one or more different computer systems (some or all of which might be incorporated with the network aggregation device 105). The arrangement of these functions, and the location of such computer systems, can vary by embodiment, with the understanding that implementation-specific requirements can result in a number of different topologies.

Figure 2:
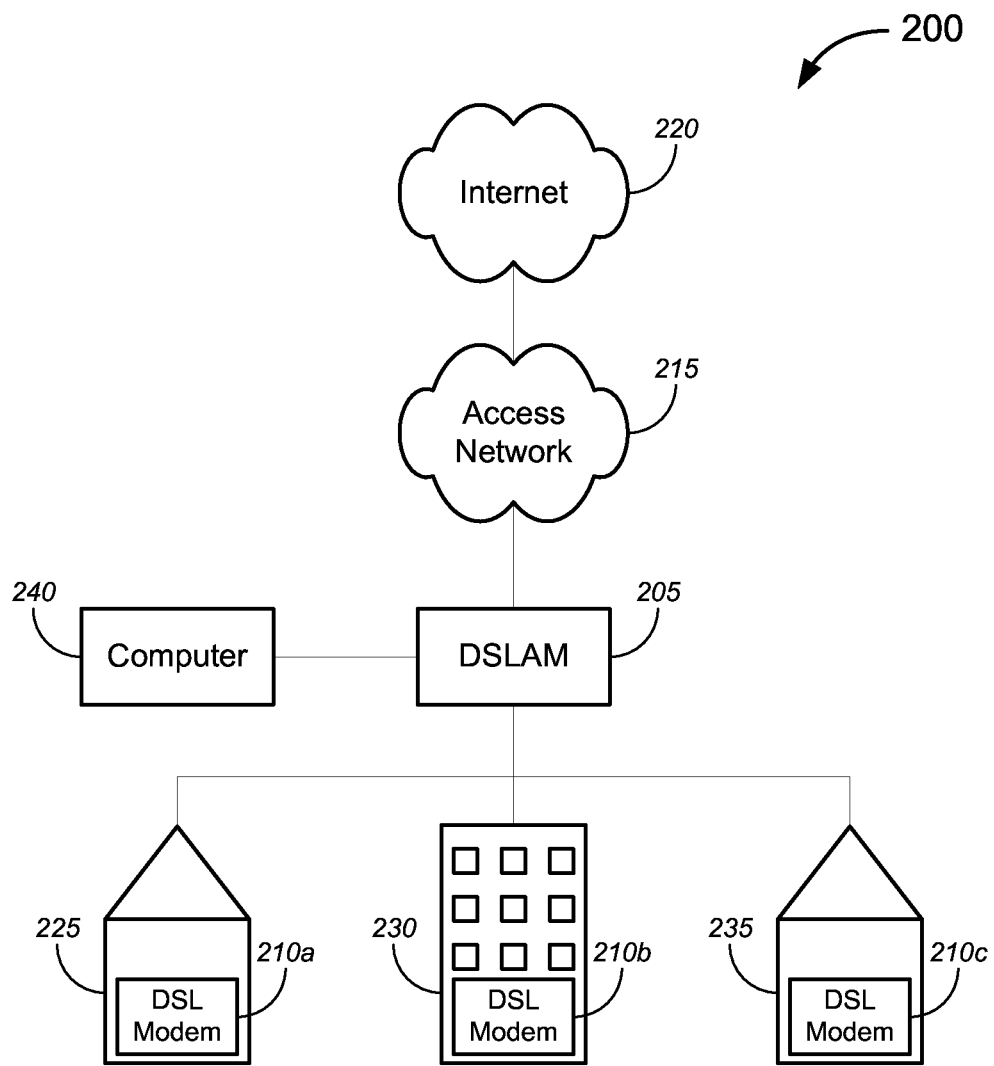

The generic architecture of the system 100 illustrated by FIG. 1 can be implemented in a variety of ways. Merely by way of example, FIG. 2 illustrates a system 200 that is one implementation of the generic system 100 described above. The system 200 includes a network aggregation device (in this case, a DSLAM 205) that provides DSL network connectivity between a plurality of DSL modems 210 and an access network 215, which correspondingly provides connectivity (e.g., though the ISP's core network, which is not shown on FIG. 2) with the Internet 220. (In an aspect of some embodiments, the DSLAM 205 can be considered part of the access network 215.)

In the illustrated embodiment, a first subscriber DSL modem 210*a* is located at a first subscriber premises 225, which is the home of a subscriber that has subscribed to residential DSL services with the ISP that operates the DSLAM 205 (and, more broadly, the access network 215). A second DSL modem 210*b* is located at a second subscriber premises, which is a business location of a second subscriber. The second subscriber might have subscribed to business-class DSL service from the ISP. A third DSL modem 210*c* might correspond to a third subscriber location 235, which is the home of a third subscriber who has subscribed to residential DSL service from the ISP.

The system 200 might also include a management computer 240 similar to the management computer 115 described above. As noted above, the management computer 240 can be incorporated within the DSLAM 205 or can be a separate device in communication with the DSLAM 205. Also as noted above, the management computer 240 can receive user input, determine a configuration for the DSLAM 205, and/or interface with the DSLAM 205 to configure the DSLAM 205 as determined.

Figure 3:
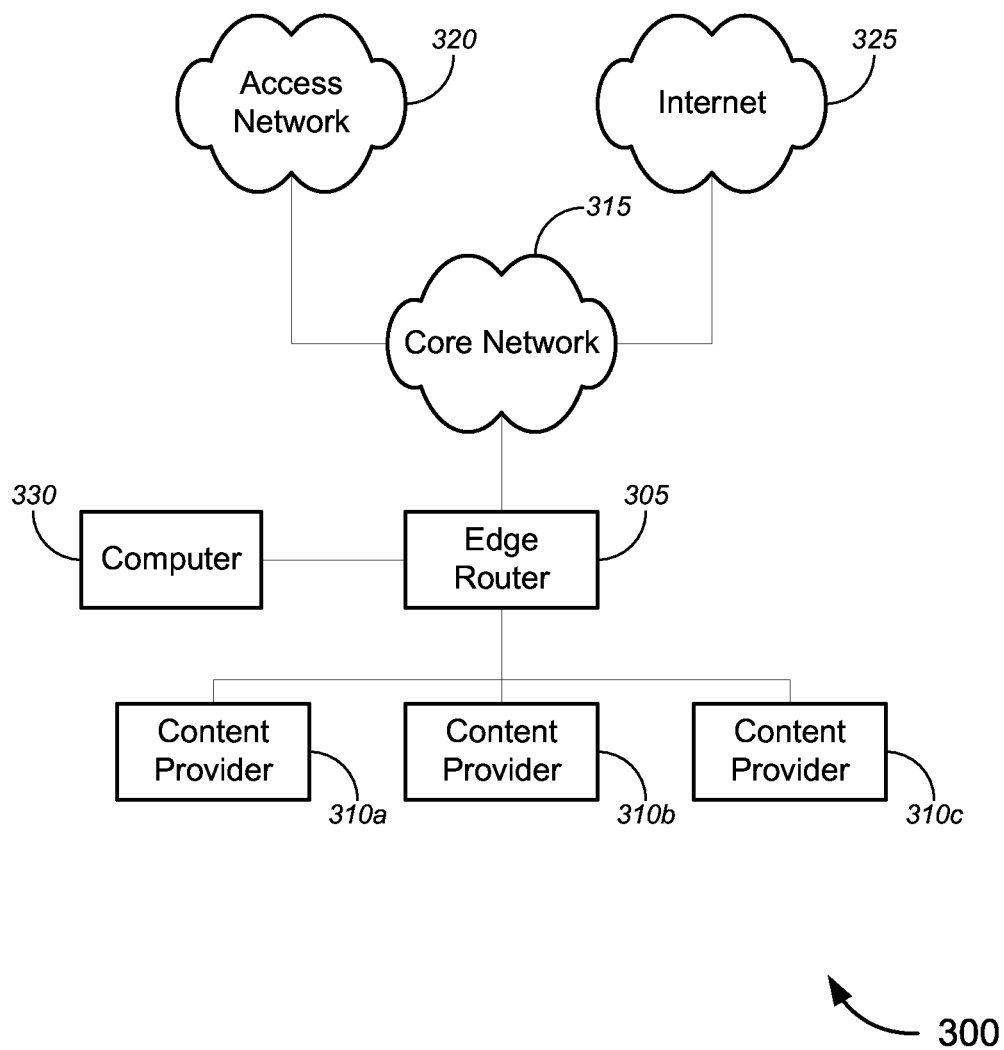

Although many embodiments are configured to provide "consumer-side" access to a network, other embodiments can be configured to provide access to a network for content providers as well. Merely by way of example, FIG. 3 illustrates a system 300 that can provide the service-selection features described herein to content providers. Such content providers can include, to name a few examples, streaming audio/video providers, such as Pandora™ or Netflix™, gaming providers, audio/video/application providers, such as Amazon™ or iTunes™, hosted application providers, cloud services providers, and/or the like. The techniques provided by various embodiments can allow such providers with the ability to access and customize the quality and quantity of network bandwidth they require to provide services to their own customers. In some cases, these embodiments can allow such content providers to configure network service dynamically to respond to changing customer demands imposed on those content providers.

The system 300 of FIG. 3 can also be considered an implementation of the generic system 100 illustrated by FIG. 1. The system 300 includes an edge router 305 (or similar network aggregation device) that provides network connectivity between a plurality of content providers 310a (each of which might have its own content distribution network that interfaces with the edge router 305) and the ISP's core network 315. The core network 315 can provide communication with the ISP's access network 320, which as noted above, can provide connectivity with, e.g., residential subscribers of the ISP (who might also be customers of one or more of the content providers 310). The core network 315 can also provide connectivity with the Internet 325, to allow the content providers 310 to serve content to other customers (who might be, for example, subscribers of a different ISP). The system 300 also includes a management computer 330 to receive user input and/or to configure the edge router 305, for example, as described above.

Figure 4A:
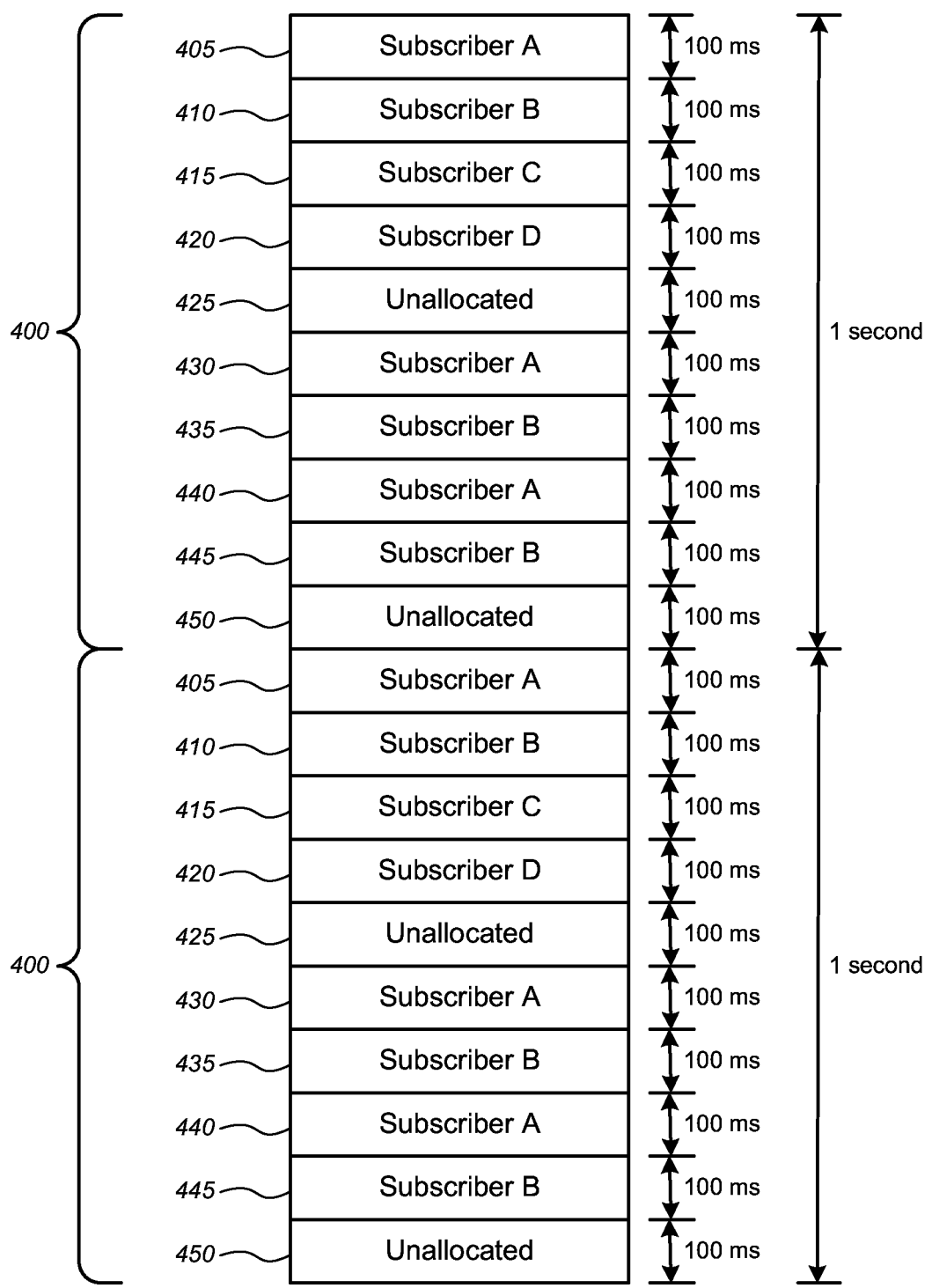

As noted above, certain embodiments employ a time-slicing technique to provide customizable network services for different subscribers. FIG. 4A illustrates this concept generically. A network aggregation device generally is continually receiving and re-transmitting network traffic (either upstream, downstream, or both). FIG. 4A represents a one-second block of time 400 during which the network aggregation device transmits. In accordance with the time-slicing technique provided by various embodiments, this one-second block of time can be subdivided, and the subdivisions (referred to herein as "time slots") can be allocated to subscribers using that network aggregation device. As illustrated, Subscriber A is allocated the first 100 ms time slot 405 of the block 400. During that subdivision 405, the network aggregation device transmits traffic (either upstream, downstream, or both) only for Subscriber A. Traffic for other subscribers is queued for transmission during periods allocated to other subscribers.

Likewise, during the next time slot 410, the network aggregation device transmits traffic only for Subscriber B, and during the third time slot 415, the network aggregation device transmits traffic only for subscriber C; during the fourth time slot 420, the network aggregation device transmits traffic only for subscriber D. As illustrated in FIG. 4A, the fifth time slot 425 is currently not allocated to a subscriber, so the network aggregation device does not transmit during this time slot. Similarly, as shown, the sixth time slot 430 and eighth time slot 440 are allocated to Subscriber A, the seventh time slot 435 and ninth time slot 445 are allocated to Subscriber B, and the tenth time slot 450 is unallocated. At the end of the one-second block 400, a new block 400 begins, and the same progression of time slots restarts.

This time-slicing technique can provide a number of features. First, it allows customization of bandwidth for different subscribers. As can be seen from FIG. 4A, Subscriber A and Subscriber B have three allocated periods during each block 400, while Subscriber C and Subscriber D each have only one allocated period. Accordingly, Subscriber A and Subscriber B each have three times the allocated bandwidth of Subscriber C or Subscriber D.

Further, during a subscriber's allocated subdivision (or period), the network aggregation device transmits traffic only for that subscriber; for example, during the first period 405, the device transmits traffic only for Subscriber A. In other words, the network aggregation device, during that period 405, transmits only traffic that either originates from Subscriber A or is addressed to Subscriber A (or, more precisely, an end device, such as a DSL modem, that is associated with Subscriber A). In one aspect of some embodiments, if Subscriber A has no upstream or downstream traffic during that period, the network aggregation device transmits no traffic, even if traffic for other subscribers is queued. In this way, the network aggregation device can simulate over subscription, by preventing a different subscriber from using bandwidth that is unused but allocated for Subscriber A. Additionally, if traffic for Subscriber A is received during that period 405, it can be transmitted immediately (until the expiration of that period 405). That means that traffic for Subscriber A will be transmitted during Subscriber A's allocated period 405, regardless of whether other traffic is queued ahead of Subscriber A's traffic.

By the same token, however, at the end of that period 405, the network aggregation device will stop transmitting traffic for Subscriber A, even if some traffic remains for that subscriber. (Such traffic will be queued and transmitted during the next period allocated for Subscriber A, which in this case is the sixth period 430.) At that point, the second period 410 begins, and the network allocation device will transmit traffic only for Subscriber B until the end of the second period 410. If no such traffic is received by the network aggregation device during that period 410, the network aggregation device will not transmit during that period.

It should be noted that the duration of the time block 400, and the duration and number of individual time slots 405-450, in FIG. 4A are exemplary in nature and are provided for illustrative purposes only. It should be appreciated, therefore, the different embodiments can feature time blocks of any suitable duration, and/or time slots (within those blocks) of any number and/or duration, e.g., depending on implementation-specific requirements. For example, to support a larger number of subscribers and/or to provide greater granularity in the ability to customize connection parameters, an embodiment might employ a greater number of time slots per block, with each time slot having a relatively shorter duration. For example, in some embodiments, each time slot might be 1 ms (or less), 10 ms, 100 ms, or the like, and each time block (e.g., the period over which a group of time slots does not repeat) might be 100 ms, 1 s, 10 s, or the like. In a typical implementation, a time block might comprise 1000 time slots of 1 ms each, with a typical residential subscriber being allocated five of those time slots for basic Internet service and a typical business subscriber being allocated 50 or 100 of those time slots for business-class service. (Of course, as noted above, using this technique, either the residential subscriber or the business subscriber might subscriber to more or fewer time slots according to that subscriber's need.)

Many variations are possible and can be employed to achieve particular performance goals. Merely by way of example, in some cases, as illustrated in FIG. 4A, each time slot will have the same duration. In other cases, different time slots within the same block might have different durations, and/or multiple, contiguous time slots can be allocated to the same subscriber to provide that subscriber with a larger time slot.

The allocation of time slots among different subscribers can be distributed so as to provide particular performance characteristics, including without limitation quality of service standards. Merely by way of example, a first set of one or more time slots, having a first aggregate amount of time (within the time block) can be allocated/reserved for one subscriber that desires a relatively low level of service, while a second set of one or more time slots, having a second aggregate amount of time (within the time block) can be allocated/reserved for another subscriber. If the second set of time slots has more aggregate time than the first set, the second subscriber will have a higher effective bandwidth available than the first subscriber. In this way, ISP can allocate time slots in order to provide different service tiers for subscribers who desire relatively lower or higher grades of service. For example, for a customer who desires a web-browsing grade of service, the ISP might reserve one pattern of time slots within a time block, such as individual time slots, which might be distributed somewhat randomly throughout the time block in order to provide a desired effective bandwidth but without concerns for QoS characteristics.

A number of other distribution patterns are possible as well, in order to effect various performance characteristics (bandwidth, QoS characteristics, etc.). FIG. 4B illustrates but a few examples of such distributions. In the time block 460 illustrated by FIG. 4B, one subscriber (Subscriber A) has been allocated four time slots 465, which are distributed evenly throughout the time block 460. Another subscriber (Subscriber B) has been allocated eight time slots 470, in two contiguous blocks. The remaining time slots 475 are allocated among a plurality of other subscribers. (Once again, for ease of description, the number of time slots illustrated is far fewer than a typical implementation, and the depicted arrangement is merely illustrative in nature.)

The distribution for Subscriber A (relatively narrow time slots distributed evenly throughout the time spectrum) might be appropriate for an application, such as voice traffic (e.g., voice over IP ("VOIP"), online gaming, etc.), which has relatively low bandwidth requirements but does require low latency. The distribution of these time slots 465 might not allow a great deal of traffic to be transmitted for Subscriber A at any given time, but the distribution does ensure that Subscriber A's traffic will never be queued for very long before it is transmitted. In a particular example, for a subscriber who wants a grade of service that can provide voice capabilities, the time slots can be distributed so as to correspond to a particular frequency that is sufficient to carry a voice stream.

Merely by way of example, a typical DS0 voice channel is a 64 kbps stream composed of 8 bit bytes that represent a voice sample. The voice samples occur at a rate of 8000 samples per second or every 125 μs. Tolerable end-to-end latency for voice should be <150 ms. To support this rate, the system might allocate time slots to a voice subscriber that would provide for transmission of a packet with voice samples at least once every 150 ms (less some amount to account for propagation delay). In addition, it might be helpful to minimize the jitter (the variability of the delay) by transmitting at a constant rate. Thus, such a subscriber could be allocated a plurality of 10 μs time slot distributed every 125 μs throughout the time block. This allocation would provide constant rate transmission (by distributing the time slots on a constant period) and meet latency constraints (by ensuring transmission within the acceptable latency window).

Conversely, the distribution of time slots 470 allocated to Subscriber B does not guarantee low latency. However, that distribution does provide Subscriber B with two large blocks of contiguous time slots, which can provide relatively high bandwidth. This allocation might be suitable for a subscriber who has subscribed to a grade of service that supports audio and/or video services (e.g., IPTV, streaming video, streaming audio) over his broadband connection, because the blocks of time slots 470 will allow a large amount of video to be streamed and buffered at the subscriber's computer, then played back from the buffer until the next group of time slots 470 occurs, when additional video can be downloaded. (Of course, some video applications might also impose latency constraints, so time slot distribution patterns to obtain a particular frequency or period, as described above, could be implemented for video applications as well.)

The remaining time slots 475 might be allocated to subscribers who require neither high bandwidth nor low latency, such as subscribers who use their network connections primarily for e-mail, online chat, and/or general web browsing. For those subscribers, neither the number of time slots allocated nor the distribution of those time slots is particularly important, so those subscribers can be allocated time slots to fill the remainder of the time block 460. Such subscribers might be charged a lower subscription fee than Subscriber A or Subscriber B, who have more demanding requirements.

Figure 5:
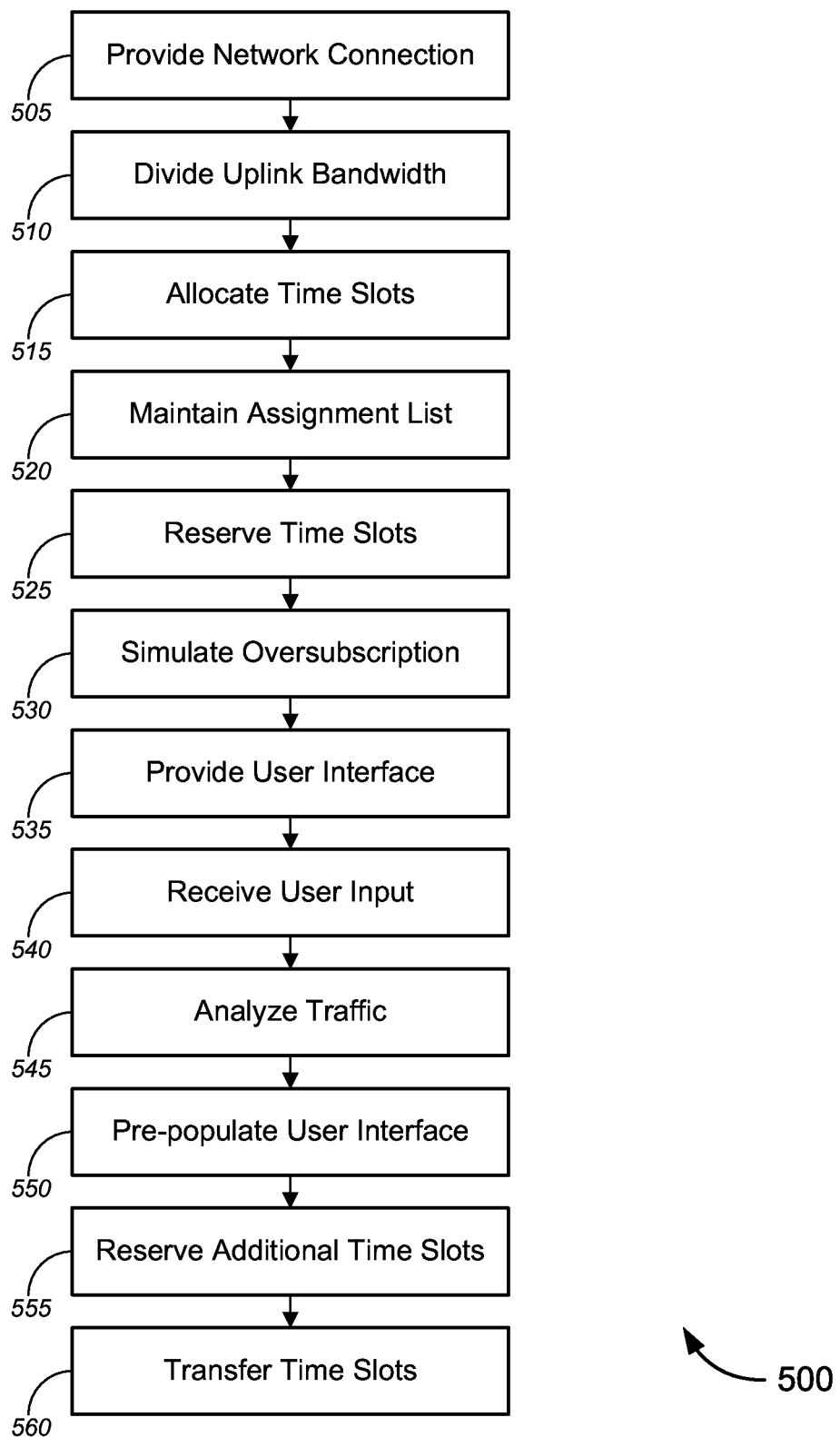
FIG. 5 is a process flow diagram illustrating a method of providing configurable network services, in accordance with various embodiments.

FIG. 5 illustrates an exemplary method 500 of providing configurable network services, in accordance with a set of embodiments. It should be appreciated that the various techniques and procedures of the illustrated method can be combined in any suitable fashion. Similarly, while the techniques and procedures are depicted and/or described in a certain order for purposes of illustration, it should be appreciated that certain procedures may be reordered and/or omitted within the scope of various embodiments. Moreover, while the techniques and procedures illustrated by FIG. 5 can be implemented by (and, in some cases, is described below with respect to) the systems 100, 200, and 300 of FIGS. 1-3 (or components thereof), these methods may also be implemented using any suitable hardware implementation. Similarly, while the systems 100, 200, and 300 of FIGS. 1-3 (and/or components thereof) can operate according to the procedures and techniques illustrated by FIG. 5 (e.g., by executing instructions embodied on a computer readable medium), the systems can also operate according to other modes of operation and/or perform other suitable procedures.

The method 500, in some cases, comprises providing network connections for a plurality of subscribers (block 505). Merely by way of example, a network aggregation device (such as a DSLAM, core router, ONU, etc.) might be connected with a plurality of subscriber devices (DSL modems, subscriber routers, etc.) and might also be connected via an uplink with the access network and/or core network of the ISP operating the network aggregation device, and ultimately with the Internet through these networks. The network aggregation device, then provides a network connection for each of the subscriber devices, passing network traffic (e.g., IP packets) from each subscriber device through the uplink and distributing traffic from the uplink to subscriber devices according to the addressing information in the traffic. In an aspect, the uplink has an aggregate uplink bandwidth to the ISP; this aggregate uplink bandwidth is the overall bandwidth the network aggregation device can provide for all subscribers, and it must be divided between subscribers.

Accordingly, certain embodiments provide novel techniques for dividing this bandwidth between the attached subscribers. Merely by way of example, at block 510, the method 500 might comprise dividing the aggregate uplink bandwidth into a plurality of time slots, e.g., using one of the time slicing techniques described above. In an aspect, as described further above, the network aggregation device dedicates all (or substantially all) of the aggregate uplink bandwidth to a particular subscriber for each time slot that is allocated to that subscriber. In a typical embodiment, the network aggregation device will be configured (e.g., with a management computer) to define a repeating block of time, and then to subdivide each repeating block of time into a specified number of time slots, with the duration and allocation of the time slots remaining constant from one block to the next. The time slots might all have the same duration (e.g., 1 ms each), although this is not required.

In some cases, the method 500 comprises allocating the plurality of time slots among the plurality of subscribers (block 515). A variety of techniques can be used to allocate the time slots. Merely by way of example, in some embodiments, time slots might be allocated to subscribers randomly, in accordance with the amount of bandwidth purchased by each subscriber. In other case, as described above, the allocated time slots might be distributed among the time block so as to implement one or more QoS policies for some or all of the subscribers. For instance, a plurality of time slots allocated to a particular subscriber might be distributed evenly throughout the time block to provide for low-latency service. As another example, two or more contiguous (consecutive) time slots might be allocated to the same subscriber to serve as a single, larger time block to provide for high-bandwidth service. Other distributions are possible as well.

In an exemplary embodiment, the method 500 might comprise maintaining a list of time slot assignments (block 520), which can be used to manage the allocation of time slots. For example, the list might comprise a table, database, and/or other data arrangement (stored on the management computer, the network aggregation device) that correlates each allocated time slot with the subscriber to which the time slot is allocated. More particularly, the list might correlate each allocated time slot with a device identifier (e.g., IP address, MAC address) of a device (e.g., broadband modem) for which traffic will be transmitted during that time slot. In another aspect, the list might identify unallocated (i.e., unreserved) time slots, which are free for allocation to a subscriber when needed (or requested by the subscriber). According to certain embodiments, the management computer and/or the network aggregation device can search or consult this list to determine which time slots remain available to identify time slots to allocate to a new subscriber (or to a subscriber that has requested an upgrade in service). In some cases, this list might be made available to subscribers to review.

At block 525, the method might comprise reserving one or more of the time slots for each of the plurality of customers. In an aspect, after a time slot has been allocated to a particular subscriber, that time slot is reserved for the subscriber (such that allocating and reserving a time slot might be considered, in some embodiments, to be part of the same operation). In another aspect, when a time slot is reserved for a subscriber, that time slot is dedicated to that subscriber, as noted above. Hence, if the subscriber has traffic (either upstream and/or downstream) that needs to be transmitted during that time slot, that traffic will be prioritized. The traffic of any other subscriber will not be transmitted (if at all) until the allocated subscriber's traffic has been transmitted.

The following example is illustrative of this concept: In a situation where, a first time slot is reserved for Subscriber A and a second, consecutive time slot is reserved for Subscriber B, and Subscriber A and Subscriber B both have traffic to be transmitted by the network aggregation device (either upstream, downstream, or both). During Subscriber A's time slot, the network aggregation device prioritize traffic for Subscriber A, and will transmit that traffic to the exclusion of traffic for other subscribers. When Subscriber A's time slot ends and Subscriber B's time slot begins, the network aggregation device will immediately stop transmitting Subscriber A's traffic and prioritize Subscriber B's traffic, even if Subscriber A has traffic remaining to be sent at the end of that subscriber's time slot, and the network aggregation device will transmit Subscriber B's traffic to the exclusion of other subscriber's traffic, even Subscriber A's traffic. In some embodiments, if the network aggregation device finishes transmitting Subscriber B's traffic before the expiration of Subscriber B's time slot, it will transmit queued traffic for any other subscriber (subject to preemption if additional traffic for Subscriber B is received during the time slot). In other embodiments, as noted above, if a subscriber has no traffic to transmit during that subscriber's time slot, the network aggregation device will still queue, rather than transmit, data each other subscriber until that other subscriber's time slot occurs.

Different techniques can be used to effect the reservation of time slots. Merely by way of example, in some cases, each of the time slots can be provisioned at the network aggregation device. As another example, the network aggregation device might employ a guard band to establish boundaries between time slots As an example, a multiple access environment like a wireless TDMA network, it can be beneficial to provide some guard time because one handset may be close to the base station, and another may be on the edge of the cell. In this case, there is measurable propagation delay over the air (where there are no buffers) that needs to be accounted for or the time slots will begin to overlap on the air interface and create interference. This can also apply on a CATV cable modem network during a shared contention window, in which client devices are requesting time slots because the access medium is shared.

In other cases, guard bands may not be necessary. For example, in a wireline network with a dedicated access medium, as is the case with DSL, a guard band time slot may not be necessary. More generally, if there are multiple streams from different subscribers and the aggregation device is able to synchronize them through buffers so data can populate the link one time slot after another, then a guard band time slot may not be necessary.

It should be noted that the operations of allocating a time slot, maintaining a list of time slots, and/or reserving an allocated time slot can be performed as part of the same operation or sequence of operations. Moreover, it should be noted that these operations might be performed in a single iteration for a plurality of time slots allocated to a particular subscriber. Alternatively and/or additionally, these operations can be performed reiteratively to allocate and reserve different time slots, either for the same subscriber or for different subscribers.

In an aspect of some embodiments, the method 500 might include simulating oversubscription of the aggregate uplink bandwidth through the allocation of the time slots (block 530). In a conventional environment, an oversubscribed network aggregation device will appear to be busy at all times (or at least most of the time), and traffic will have to be queued before it can be transmitted. In a conventional environment, this queuing is mainly happenstance, as traffic is queued on a FIFO (first-in-first-out basis), subject in some cases to QoS tagging for certain subscribers (e.g., business subscribers). Nonetheless, a state of mild oversubscription is a favorable condition for a network aggregation device, because it represents high utilization of the device and also avoids excessive utilization by any one subscriber.

In a set of embodiments, this state of oversubscription can be simulated through the time slicing techniques described herein. More particularly, by allocating time slots and reserving those time slots for exclusive use by allocated subscribers, the network aggregation device can prevent overutilization by any particular subscriber. In one aspect, to simulate oversubscription, the network aggregation device will transmit traffic for a particular subscriber only during that particular subscriber's time slots. During an idle time slot (either a time slot reserved for another customer or an unallocated time slot), the network aggregation device will not transmit the particular subscriber's traffic. In this way, the particular subscriber is not able to over consume the resources of the network aggregation device, and each time slot remains available for that subscriber's exclusive use (for example, if traffic for that subscriber arrives midway through the subscriber's time slot, it can be transmitted immediately, even if other subscribers' traffic is already queued). In this way, the network aggregation device can also enforce QoS policies, which can be implemented (as noted above) through the distribution of allocated time slots.

In some embodiments, the reservation and/or allocation of time slots can be adjusted dynamically, either on a temporary basis or relatively more permanently, in response to one or more stimuli. Such stimuli can include a variety of factors. Merely by way of example, in some cases, a subscriber might submit a request to obtain more bandwidth (or use less bandwidth), either temporarily or indefinitely. Such a request can serve as a stimulus to trigger reallocation of time slots (e.g., using the procedure described above). As another example of a stimulus, an emergency condition (in which access to the network is needed by Emergency Services) can trigger a reallocation of reserved time slots to provide the Emergency Services with whatever quality of service is necessary to deal with the emergency condition. As a third example, network load (either particularly heavy or particularly light) might trigger the reallocation of time slots (either to temporarily allocate additional time slots or to temporarily suspend use of some time slots) to address such network conditions.

As noted above, in certain embodiments, subscribers can be provided with the ability to configure their own network connections. Accordingly, in some embodiments, the method 500 includes providing a user interface to receive user input (e.g., from subscribers themselves, from an administrator, etc.). In an aspect, a user interface can allow interaction between a user (e.g., a subscriber, administrator, etc.) and a computer system, such as a management computer or the like. For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc.

The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens, each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the method 500 might comprise, at block 540, receiving user input (e.g., from a subscriber).

This user input can relate to a variety of operations. Merely by way of example, in some cases, the user input might comprise a request to provision new service for a new subscriber. After identifying the subscriber (e.g., by a device identifier on the subscriber's modem, etc.), the system can allocate time slots for that device, using the process noted above. In other cases, the subscriber might provide user input requesting modification of that subscriber's service, to accommodate the subscriber's intended use of the service (e.g., gaming, VoIP calling, video streaming, web browsing, etc.). Such modification might include the allocation of additional time slots for the subscriber, deallocation of time slots (if the subscriber wishes to downgrade service), redistribution of allocated time slots, etc. In some embodiments, the allocation of time slots (and/or the corresponding service grades) can be provided to a billing system, such that charges for the service can be calculated automatically based on the allocated time slots/service grades.

It should be noted that the interface can provide flexible and responsive configuration options to a subscriber. For example, in some cases, the subscriber might be able to access the user interface to request services modifications on a temporary basis (e.g., to request additional bandwidth on a temporary basis to accommodate a large anticipated download, etc.). In some embodiments, the subscriber might be able to set a duration (e.g., a number of hours, days, etc.) for which the temporary configuration should be maintained, after which the subscriber's service is reconfigured to its original state. In other cases, the subscriber might access the user interface once to modify the service and again to modify the service back to its original configuration after the subscriber has finished whatever task required the modified configuration. An interface between the configuring device (e.g., a management computer) and a billing system can provide for flexible billing capabilities to appropriately bill for these temporary configuration modifications.

In other cases, the user interface can be employed to assist the subscriber (or another, such as an administrator) in determining how best to configure the subscriber's network connection. For example, the method 500 might include analyzing a subscriber's network traffic (e.g., historically, for some period going forward, etc.) to identify one or more types of network traffic that the subscriber typically generates (block 545). The network aggregation device might use techniques such as deep packet inspection ("DPI") to perform this analysis. Alternatively and/or additionally, the device might merely track the overall packet flow, without regard to the content of the packets.

Based on that analysis, the method 500 might comprise pre-populating the user interface with suggested traffic types (block 550), e.g., based on the subscriber's analyzed network usage. In other cases, the user interface might be configured to receive user input indicating the subscriber's desired traffic type(s), without making any a priori suggestions. Based on the identified traffic type(s), the system can determine an appropriate allocation and/or distribution of time slots to meet the subscriber's needs, and the determined time slots can be allocated and/or reserved for the subscriber, as described above. Alternatively and/or additionally, in some cases, the subscriber might be able to select individual time slots for reservation; for example, the user interface might display the time slot allocation list for the subscriber, and the subscriber could give user input (in the form of graphical manipulation of user interface widgets corresponding to particular time slots, typing of textual user input, etc.) to indicate which time slots the subscriber would like to reserve.

The user interface can provide other functionality in various embodiments. Merely by way of example, in some cases, the user interface might allow the subscriber to modify the subscriber's service (e.g., to upgrade to a higher tier or downgrade to a lower tier of service, to implement QoS characteristics, etc.). Thus, for example, in a situation in which a subscriber is at a first service level (corresponding to a particular allocation of time slots), the method might comprise receiving, from the subscriber (or an administrator, etc.) user input requesting an upgrade for that subscriber to a second service level. The method, then, might comprise allocating additional time slots for that subscriber and/or reserving the allocated additional time slots for the subscriber's exclusive use (block 555). Collectively, the time slots originally allocated to the subscriber and the time slots allocated in response to the request might correspond to the upgraded service level.

Other embodiments, can enable future bandwidth reservation by a subscriber, and/or and provided the ability to resell excess bandwidth from one customer to another and billed accordingly to an agreed upon set of terms and conditions. For example, the user interface might allow a first user to transfer (either temporarily or permanently) to a second user some or all of the time slots reserved for the first user (block 560). This transfer might be accompanied by an appropriate increase in the transferee's billed charges (and/or a corresponding decrease in the transferor's billed charges). Alternatively and/or additionally, negotiation of recompense for the transfer could be left for the subscribers to perform privately. In some cases, the user interface might provide a marketplace for subscribers to find transfer counterparties, for either temporary or permanent transfers of time slots. In these ways, certain embodiments can provide for unprecedented flexibility for subscribers to customize network performance configuration on either a short-term or long-term basis, to provide each subscriber with an optimum balance of price and network performance according to that subscriber's needs.

Figure 6:
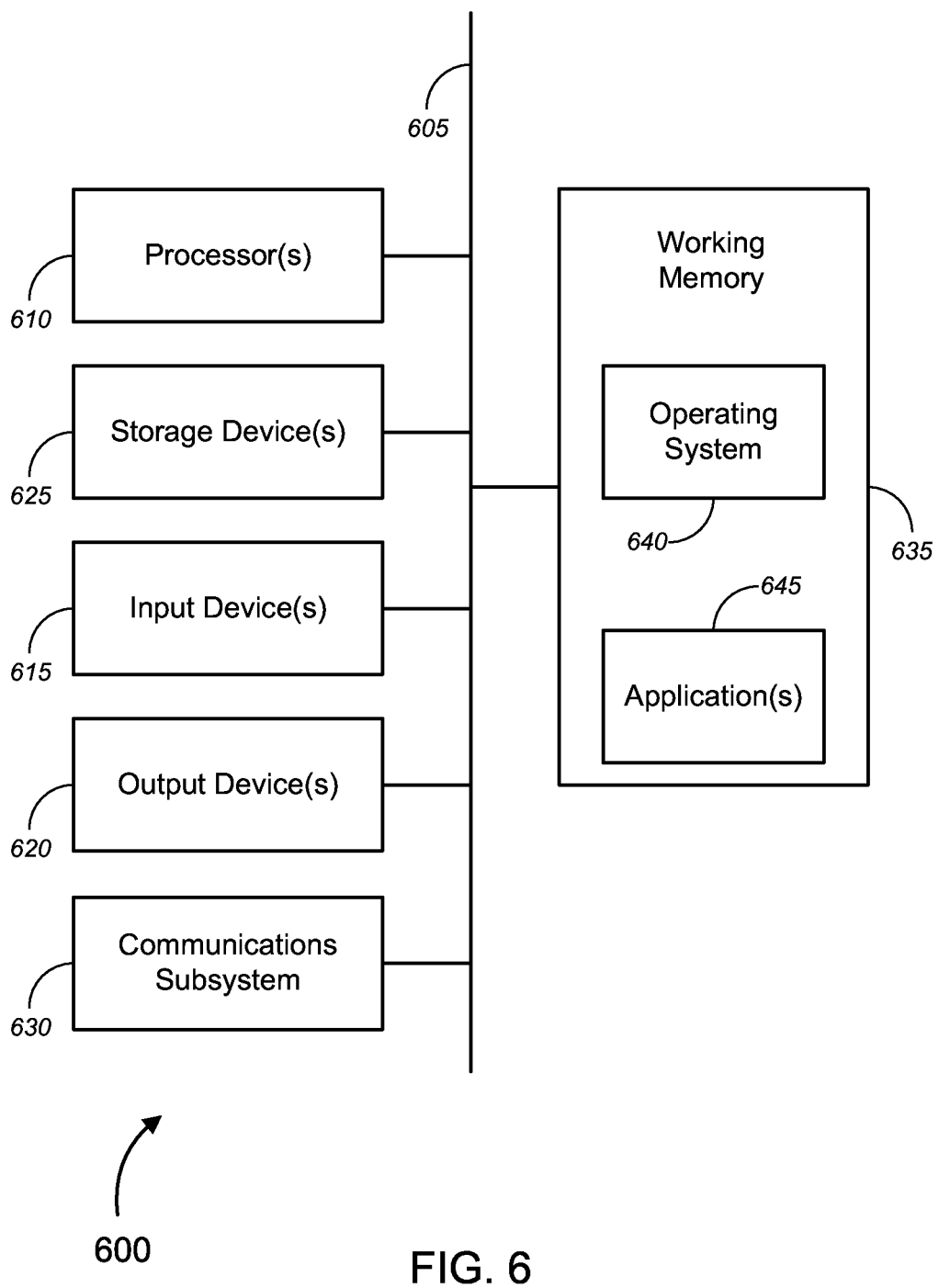
FIG. 6 is a generalized schematic diagram illustrating a computer system, in accordance with various embodiments.

FIG. 6 provides a schematic illustration of one embodiment of a computer system 600 that can perform the methods provided by various other embodiments, as described herein, and/or can function as a management computer, web server, network aggregation device, and/or the like. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner. It should be noted, as well, that a typical network aggregation device will typically comprise highly customized hardware; for example, the communication subsystem might comprise one or more optical transceivers, uplink ports, subscriber ports, and/or the like, and the processing system generally will comprise one or more special purpose networking processors. The hardware configuration of various network aggregation devices is well known to those skilled in the art and need not be described in detail herein.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media.

Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes;

likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing configurable network services to both residential and business customers, the method comprising:
   providing, with a digital subscriber line access multiplexer ("DSLAM"), network connections for a plurality of subscribers, the plurality of subscribers comprising a residential subscriber charged a residential subscription rate and a business subscriber charged a business subscription rate, the DSLAM having an aggregate uplink bandwidth to an Internet service provider ("ISP");
   dividing, with a management computer, the aggregate uplink bandwidth into a plurality of time slots;
   maintaining, with the management computer, a list of time slot assignments, the list of time slot assignments correlating reserved time slots with subscribers and identifying unreserved time slots;
   reserving, with the management computer, a first subset of the time slots for the residential subscriber, the first subset of time slots having a first aggregate amount of time;
   reserving, with the management computer, a second subset of the time slots for the business subscriber, the second subset of time slots having a second aggregate amount of time, the second aggregate amount of time being larger than the first aggregate amount of time;
   simulating oversubscription of the aggregate upstream bandwidth by transmitting network traffic for the residential subscriber only during the first subset of the plurality of time slots, transmitting network for the business subscriber only during the second subset of the plurality of time slots, and not transmitting any network traffic for any subscriber during the unreserved time slots;
   providing, with the management computer, a user interface to receive user input from subscribers;
   receiving first user input from the residential subscriber identifying a first one or more network traffic types;
   allocating the first subset of time slots based at least in part on the identified first one or more network traffic types;
   receiving second user input from the business subscriber identifying a second one or more network traffic types; and
   allocating the second subset of time slots based at least in part on the identified second one or more network traffic types.

2. A method of providing configurable network services, the method comprising:
   providing, with a network aggregation device, network connections for a plurality of subscribers, the network aggregation device having an aggregate uplink bandwidth;
   dividing the aggregate uplink bandwidth into a plurality of time slots;
   reserving one or more of the plurality of time slots for each of the plurality of subscribers, wherein the plurality of subscribers comprises a first subscriber at a first service level corresponding to a first subset of the plurality of time slots;
   simulating oversubscription of the aggregate uplink bandwidth through allocation of the plurality of time slots;
   providing a user interface to receive user input from subscribers;
   receiving user input from the first subscriber requesting an upgrade to a second service level; and
   reserving an additional subset of the plurality of time slots for the first subscriber, the first subset and the additional subset collectively corresponding to the second service level.

3. The method of claim 2, further comprising dynamically adjusting the allocation of the plurality of time slots in response to a stimulus.

4. The method of claim 3, wherein the stimulus comprises an emergency condition.

5. The method of claim 3, wherein the stimulus comprises a network load.

6. The method of claim 2, wherein the network aggregation device is a digital subscriber line access multiplexer ("DSLAM").

7. The method of claim 2, wherein the network aggregation device is an optical line terminal ("OLT").

8. The method of claim 2, wherein reserving one or more of the plurality of time slots comprises employing a guard band with the network aggregation device.

9. The method of claim 2, wherein reserving one or more of the plurality of time slots comprises provisioning the plurality of time slots at the network aggregation device.

10. The method of claim 2, further comprising:
    determining which of the plurality of time slots are available for reservation.

11. The method of claim 2, wherein:
    the first subscriber is subscribed to a low level of service and the first subset of the plurality of time slots comprises a first one or more time slots having a first aggregate amount of time;
    the plurality of subscribers further comprises:
       a second subscriber subscribed to a high level of service; and
    reserving one or more of the plurality of time slots further comprises:
       reserving a second one or more time slots, having a second aggregate amount of time, for the second subscriber, the second aggregate amount of time being greater than the first aggregate amount of time.

12. The method of claim 2, wherein each of the plurality of subscribers is a content provider that provides content for download by consumers.

13. The method of claim 2, wherein simulating oversubscription comprises:
    for each of the plurality of subscribers, transmitting network traffic only during the one or more time slots reserved for that subscriber, regardless of whether uplink bandwidth is available during time slots not reserved for that subscriber.

14. The method of claim 2, and wherein reserving one or more of the plurality of time slots comprises reserving the first subset of the plurality of time slots according to one or more grades of service to which the first subscriber subscribes.

15. The method of claim 14, wherein the one or more grades of service comprises a web-browsing grade of service, and wherein reserving the first subset of the plurality of time slots comprises reserving a portion of the first subset of the plurality of time slots as individual time slots distributed throughout the plurality of time slots.

16. The method of claim 14, wherein reserving the first subset of the plurality of time slots comprises reserving at least a portion of the subset of the plurality of time slots distributed evenly throughout the plurality of time slots corresponding to a particular frequency.

17. The method of claim 16, wherein the one or more grades of service comprises a voice service, and wherein the frequency of the portion of the first plurality of time slots is sufficient to carry a voice stream.

18. The method of claim 14, wherein the one or more grades of service comprises an audio or video service, and reserving the first subset of the plurality of time slots comprises clustering at a portion of the subset of the plurality of time slots contiguously to create a single, larger time slot.

19. The method of claim 18, wherein the audio or video service is selected from the group consisting of Internet Protocol television ("IPTV") service, streaming video service, and streaming audio service.

20. The method of claim 14, wherein the one or more grades of service comprises voice over Internet Protocol ("VoIP") service.

21. The method of claim 2, wherein the user interface comprises a web page.

22. The method of claim 2, wherein the user input requests an upgrade only for a limited time, the method further comprising:
 after the expiration of the limited time, reverting the subscriber to the first service level by deallocating the reserved additional subset of the plurality of time slots.

23. The method of claim 2, further comprising:
 receiving user input from the first subscriber requesting to release some bandwidth allocated to the first subscriber; and
 deallocating at least one of the one or more time slots reserved for the first subscriber.

24. The method of claim 2, further comprising:
 receiving user input from the first subscriber, the user input indicating a network traffic type; and
 allocating one or more time slots reserved for the first subscriber, based at least in part on the indicated traffic type.

25. The method of claim 24, further comprising:
 analyzing network traffic of the first subscriber; and
 pre-populating the user interface with suggested traffic types based at least in part on analysis of the network traffic of the first subscriber.

26. The method of claim 2, wherein the user interface allows the first user to transfer to a second user at least some of the time slots reserved for the first user.

27. A system, comprising: a network aggregation device that provides network connections for a plurality of subscribers, the network aggregation device having an aggregate uplink bandwidth; and a management computer in communication with the network aggregation device, the management computer comprising: one or more processors; and a non-transitory computer readable medium in communication with the one or more processors, the computer readable medium having encoded thereon a set of instructions executable by the computer system to perform one or more operations, the set of instructions comprising: instructions for dividing the aggregate upstream bandwidth into a plurality of time slots; instructions for reserving one or more of the plurality of time slots for each of the plurality of subscribers, wherein the plurality of subscribers comprises a first subscriber at a first service level corresponding to a first subset of the plurality of time slots; instructions for simulating oversubscription of the aggregate upstream bandwidth through allocation of the plurality of time slots; instructions for providing a user interface to receive user input from subscribers; instructions for receiving user input from the first subscriber requesting an upgrade to a second service level; and instructions for reserving an additional subset of the plurality of time slots for the first subscriber, the first subset and the additional subset collectively corresponding to the second service level.

28. The system of claim 27, wherein the network aggregation device comprises the management computer.

29. The system of claim 27, wherein the set of instructions further comprises instructions for configuring the network aggregation device to implement the allocation of the plurality of time slots.

30. An apparatus, comprising:
 a non-transitory computer readable medium having encoded thereon a set of instructions executable by one or more computers to perform one or more operations, the set of instructions comprising:
  instructions for configuring a network aggregation device that provides network connections for a plurality of subscribers, the network aggregation device having an aggregate uplink bandwidth;
  instructions for dividing the aggregate upstream bandwidth into a plurality of time slots;
  instructions for reserving one or more of the plurality of time slots for each of the plurality of subscribers, wherein the plurality of subscribers comprises a first subscriber at a first service level corresponding to a first subset of the plurality of time slots;
  instructions for simulating oversubscription of the aggregate upstream bandwidth through allocation of the plurality of time slots;
  instructions for providing a user interface to receive user input from subscribers;
  instructions for receiving user input from the first subscriber requesting an upgrade to a second service level; and
  instructions for reserving an additional subset of the plurality of time slots for the first subscriber, the first subset and the additional subset collectively corresponding to the second service level.

* * * * *